April 22, 1952     A. P. MONTEVERDE     2,593,908
AUTOMOBILE BUMPER ATTACHABLE RACK
Filed Aug. 20, 1948     2 SHEETS—SHEET 1
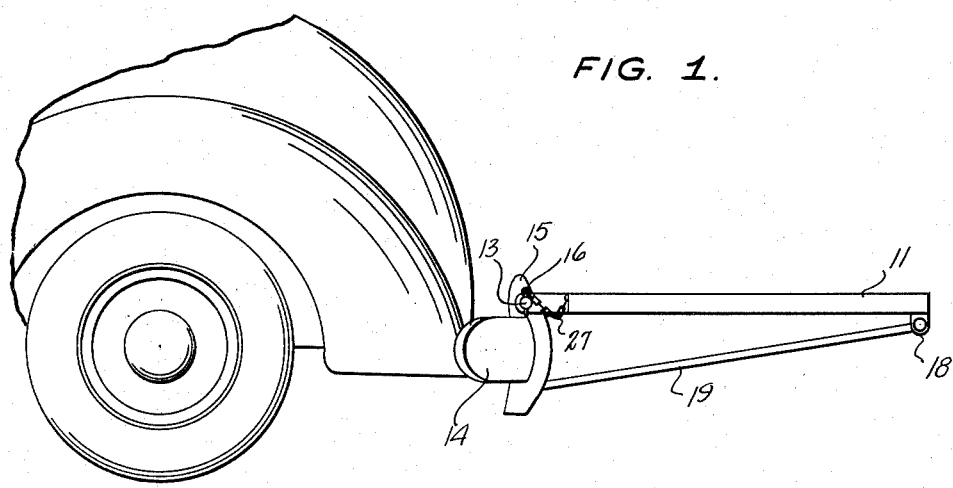
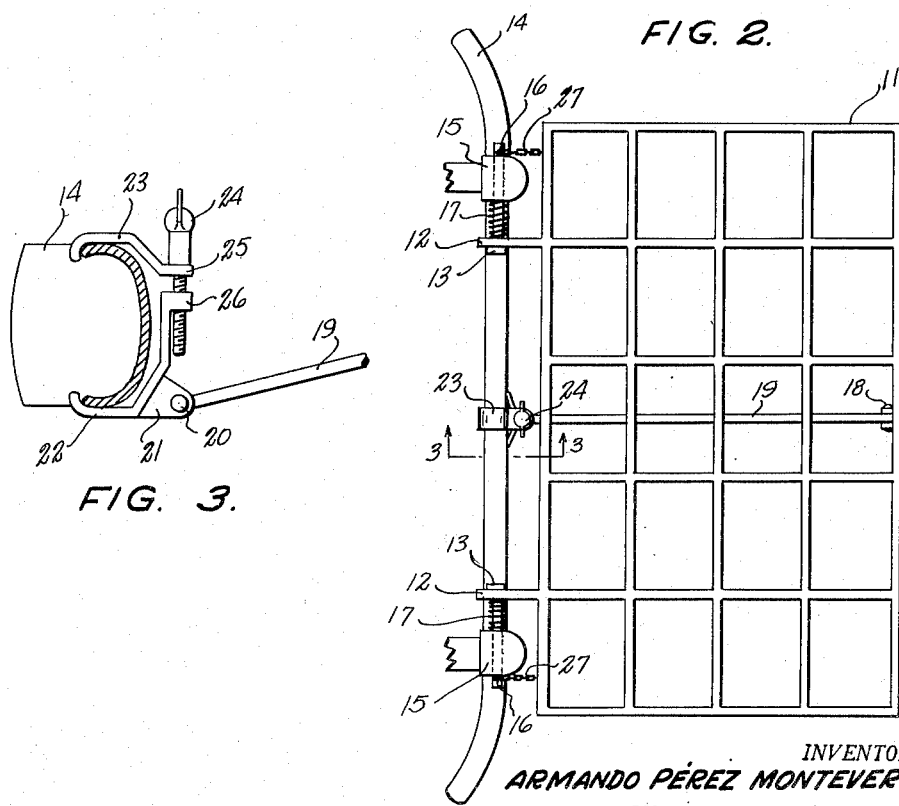
INVENTOR.
ARMANDO PÉREZ MONTEVERDE,
BY
McMorrow, Berman & Davidson
ATTORNEYS.

April 22, 1952     A. P. MONTEVERDE     2,593,908
AUTOMOBILE BUMPER ATTACHABLE RACK
Filed Aug. 20, 1948     2 SHEETS—SHEET 2
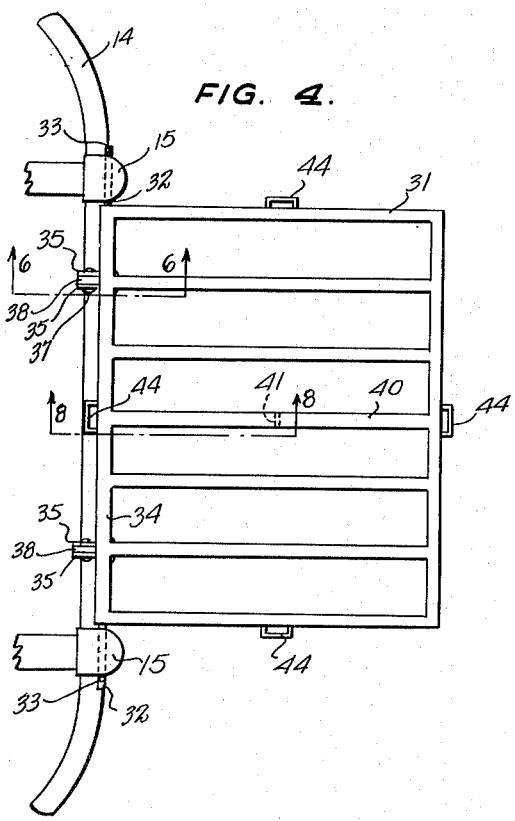
FIG. 4.
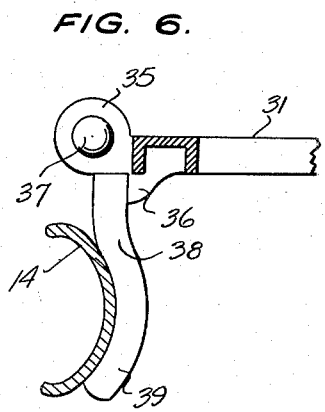
FIG. 6.
FIG. 7.
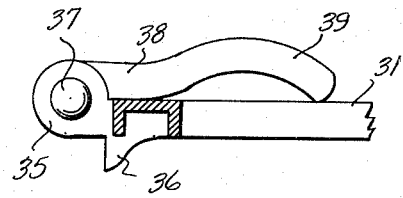
FIG. 5.
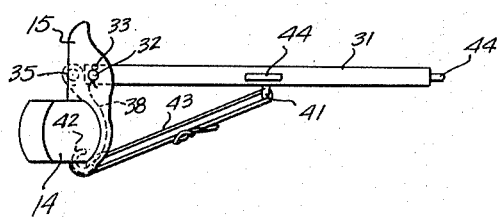
FIG. 8.
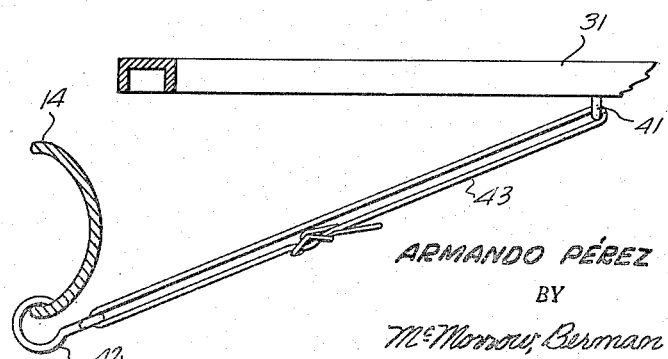
INVENTOR.
ARMANDO PÉREZ MONTEVERDE,
BY
McMorrow, Berman & Davidson
ATTORNEYS.

Patented Apr. 22, 1952

2,593,908

UNITED STATES PATENT OFFICE 2,593,908

AUTOMOBILE BUMPER ATTACHABLE RACK

Armando P. Monteverde, Caracas, Venezuela

Application August 20, 1948, Serial No. 45,322

1 Claim. (Cl. 224—42.03)

This invention relates to rack devices, and more particularly to a foldable suitcase rack for automobiles.

A main object of the invention is to provide a novel and improved luggage rack adapted to be attached to the rear bumper of an automobile, said rack being very simple in construction, easy to install, and greatly increasing the luggage-carrying capacity of the automobile.

A further object of the invention is to provide an improved foldable luggage rack for attachment to the rear bumper of an automobile, said rack being very inexpensive to manufacture, being very sturdy in construction, being neat in appearance, and providing a means of transporting relatively large articles of luggage such as trunks or suitcases which would not ordinarily fit into the luggage compartment of the vehicle or which would occupy too much space within the passenger compartment of the vehicle.

Further objects and advantages of the invention will become apparent from the following description and claim, and from the accompanying drawings, wherein:

Figure 1 is an end elevational view of the rear portion of an automobile equipped with one form of luggage rack constructed in accordance with the present invention.

Figure 2 is a top plan view of the luggage rack of Figure 1.

Figure 3 is an enlarged cross-sectional detail view taken on line 3—3 of Figure 2.

Figure 4 is a top plan view similar to Figure 2 but showing another form of luggage rack constructed according to the present invention.

Figure 5 is a side elevational view of the luggage rack of Figure 4.

Figure 6 is an enlarged cross-sectional detail view taken on line 6—6 of Figure 4.

Figure 7 is a detail view similar to Figure 6 but showing the parts in folded inoperative positions.

Figure 8 is an enlarged cross-sectional detail view taken on line 8—8 of Figure 4.

Referring to the drawings, and more particularly to Figures 1 to 3, the rack may comprise a generally rectangular grid-like frame 11 formed at one margin thereof with apertured projections 12, 12. Extending outwardly through said projections are headed bolt members 13, 13. Designated at 14 is the rear bumper of an automobile and mounted on said rear bumper are conventional bumper guards 15, 15. The bumper guards are formed with transverse apertures through which the bolt members 13, 13 pass, the bolt members being provided at their outer ends with suitable pins 16 such as cotter pins, restraining the bolt members against inward axial movement. Coiled springs 17 encircle the shanks of the bolt members 13 and bear between the respective projections 12 and the bumper guards 15, as shown in Figure 2, said springs cushioning the rack frame 11 and restraining said frame against lateral movement. Pivotally connected at 18 to the mid-portion of the rear marginal element of the frame 11 is a strut member 19. The forward end of strut member 19 is pivotally connected at 20 to a lug 21 carried by a bottom clamp element 22 engaged with the bumper 14, as shown in Figure 3. Designated at 23 is the top bumper clamp element, the top clamp element 23 being adjustably secured to the bottom clamp element 22 by a wing bolt 24 passing through a rear flange 25 on the top clamp element and threaded into a rear flange 26 carried by the bottom clamp element. When the parts are secured to the rear bumper 14 in the manner illustrated in Figures 1 to 3, the strut member 19 supports the load carrying frame 11 in a horizontal position, and as above explained, the springs 17 cushion the frame against lateral shocks.

The pins 16 are preferably attached to the frame 11 by chains 27 to prevent loss of said pins.

Referring now to Figures 4 to 8, wherein a second form of luggage rack device is illustrated, 31 designates the load-supporting frame of the rack device. The frame 31 is formed at its forward corners with laterally projecting pins 32, 32 which pass through transverse apertures drilled in the bumper guards 15, 15. Suitable cotter pins 33, 33 may be inserted through the ends of the pins 32, 32. The forward transverse marginal element 34 of the frame 31 is formed with spaced pairs of apertured projections 35, 35 and a depending shoulder lug 36 rearwardly adjacent and traversing each pair of apertured projections. Pivotally secured between each pair of apertured lugs 35, 35 by a hinge pin 37 is an arm 38 having an arcuately curved portion 39 shaped to fit the contour of the bumper 14, as shown in Figure 6, the downward swinging of frame 31 being prevented by the engagement of the stop lugs 36 with the respective arms 38. When the rack device is detached from the bumper 14, the arms 38 may be swung to the folded positions shown in Figure 7, wherein said arms overlie the rack frame 31.

The intermediate frame element, designated at 40, is formed with a depending eye 41. Designated at 42 is a hook member connected to eye 41 by an adjustable flexible strap 43, said hook member 42 being engageable with the bottom edge of the bumper 14 in the manner shown in Figure 8 to restrain the rack frame 31 against upward rotation. When strap 43 is loosened, hook member 42 may be disengaged from bumper 14 and the rack frame 31 may be elevated to an upstanding inoperative position. Handles 44 are provided at the marginal portions of the rack frame to facilitate manipulation of said frame.

In arranging the luggage rack of Figures 4 to 8 for use, the frame 31 is rotated downwardly from its upstanding inoperative position to a horizontal position, wherein the stop lugs 36 abut the arms 38 and said arms abut the bumper 14, as shown in Figure 6. The hook member 42 is then engaged with the lower edge of the bumper, as shown in Figure 8, and the strap 43 is tightened.

The rack device shown in Figures 1 to 3 may be rotated to an inoperative upstanding position by first loosening the clamp screw 24 to disengage the clamp members 22 and 23 from the bumper.

The rack devices shown respectively in Figures 1 to 3 and in Figures 4 to 8, are each preferably dimensioned so that they may be detached from the rear bumper of the automobile and stored in the luggage compartment thereof, when use of said rack devices is not required. In this manner the rack devices may be carried with the automobile at all times and will be available for attachment to the rear bumper of the automobile whenever required.

While certain specific embodiments of automobile luggage rack devices have been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A luggage rack for attachment to the rear bumper and bumper guards of an automobile comprising a grate-like load-supporting frame having one end arranged in confronting relation with respect to said bumper, laterally-projecting pin members on the confronting end of said frame and rotatably engaging each of said bumper guards for pivotally connecting the frame to said bumper for movement from a vertical position to a horizontal position, spring means operatively connected to each of said pin members for cushioning the frame against movement laterally, a rigid tie bar positioned beneath and intermediate the sides of said frame when the latter is in the horizontal position and having one end pivotally secured to the frame adjacent the other end thereof, and clamping means on the other end of said tie rod detachably engaging the portion of the bumper adjacent thereto.

ARMANDO P. MONTEVERDE.

REFERENCES CITED

The following references are of record in the file of this patent:

UNITED STATES PATENTS

| Number | Name | Date |
|---|---|---|
| 1,116,039 | Dunham | Nov. 3, 1914 |
| 1,637,752 | Laher | Aug. 2, 1927 |
| 1,977,735 | Monckmeier | Oct. 23, 1934 |
| 2,146,642 | Mueth | Feb. 7, 1939 |
| 2,180,333 | Boggia | Nov. 21, 1939 |
| 2,204,824 | Rock | June 18, 1940 |
| 2,246,813 | Preston | June 24, 1941 |
| 2,394,447 | Hemp | Feb. 5, 1946 |
| 2,432,732 | Del Cano | Dec. 16, 1947 |